(12) United States Patent
Abbasi et al.

(10) Patent No.: US 12,475,159 B2
(45) Date of Patent: Nov. 18, 2025

(54) PRIVATE INTERACTIVE MODE ON MEDIA PLATFORM

(71) Applicant: Lemon Inc., Grand Cayman (KY)

(72) Inventors: Mohammad Ali Abbasi, Culver City, CA (US); Shervin Shahryari, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 252 days.

(21) Appl. No.: 18/172,438

(22) Filed: Feb. 22, 2023

(65) Prior Publication Data

US 2024/0281460 A1 Aug. 22, 2024

(51) Int. Cl.
*G06F 16/435* (2019.01)
*G06F 16/34* (2025.01)
*G06F 21/62* (2013.01)

(52) U.S. Cl.
CPC ............ *G06F 16/435* (2019.01); *G06F 16/34* (2019.01); *G06F 21/6245* (2013.01)

(58) Field of Classification Search
CPC ..... G06F 16/435; G06F 16/34; G06F 21/6245
See application file for complete search history.

(56) References Cited

U.S. PATENT DOCUMENTS

| | | | |
|---|---|---|---|
| 10,817,791 B1 | 10/2020 | Shoemaker et al. | |
| 2015/0254475 A1* | 9/2015 | Bauer | G06F 40/143 |
| | | | 715/205 |
| 2015/0281383 A1* | 10/2015 | Bilinski | H04L 67/53 |
| | | | 709/202 |
| 2016/0098640 A1* | 4/2016 | Su | G06N 5/02 |
| | | | 706/50 |
| 2017/0046533 A1 | 2/2017 | Retter et al. | |
| 2021/0124840 A1 | 4/2021 | Dotan-Cohen et al. | |

OTHER PUBLICATIONS

International Search Report issued in PCT/SG2024/050088, dated Apr. 18, 2024.
Gupta K. D. et al., "Leveraging Reinforcement Learning to Build a Recommendation System for Incognito Mode Users", ICML 2021 Workshop on Representation Learning for Finance and e-Commerce Applications, Jun. 30, 2021.
"Browse YouTube while incognito on mobile devices", artical and vedio available via https://support.google.com/youtube/answer/9040743?hl=en; no date is identified.

* cited by examiner

*Primary Examiner* — Kambiz Zand
*Assistant Examiner* — Lawrence Q Truong
(74) *Attorney, Agent, or Firm* — Fish & Richardson P.C.

(57) ABSTRACT

Methods of providing media content to a user in a private interactive mode on a media platform are provided. The media platform having a user interface and a recommendation engine can provide a first interactive mode and the private interactive mode. The recommendation engine can generate recommendations of media content based on user's requests or actions. When the user exits the private interactive mode, information associated with the private interactive mode can be permanently deleted. The recommendation engine operating in the first interactive mode can be independent of the information associated with the private interactive mode.

20 Claims, 5 Drawing Sheets

PRIVATE INTERACTIVE MODE ON MEDIA PLATFORM

FIELD

The embodiments described herein pertain generally to operations of a media platform or application to provide media content. More specifically, the embodiments described herein pertain to a private interactive mode on a media platform or application to provide media content.

BACKGROUND

Media platforms or applications allow users to create an account to view media content (e.g., to watch videos) and provide recommendations of media content to the users accordingly. When a user explores and watches new types of videos different from the user's main interest, the media platform or application may start recommending the new types of videos the user just watched, despite that the user may still want the recommendation based on the user's main interest. For example, a user's main interest is to watch videos about plumbing and construction via a media platform or application via a smartphone. One day, the user clicked on some dancing videos, and watched the dancing videos via the media platform or application on the smartphone. The next day, when the user opened the media platform or application on the smartphone, there were a lot of recommendations of dance videos, while the user still wants the recommendation based on the main interest, i.e., plumbing and construction.

SUMMARY

Features in the embodiments disclosed herein pertain to a private interactive mode on a media platform to provide media content to users. A private interactive mode described herein may enable users to explore and obtain media content in a session without affecting the user's first interactive mode associated with the user's profile on the media platform. For example, in the example described above, the user may watch the dancing videos using a private interactive mode on the media platform without affecting the user's first interactive mode to provide recommendations based on the main interest, i.e., plumbing and construction.

In one example embodiment, a method of providing media content using a private interactive mode on a media platform is provided. The method includes providing the media platform having a user interface and a recommendation engine. The media platform is configured to provide a first interactive mode and the private interactive mode. The method further includes receiving, via the user interface, an instruction to enter the private interactive mode, generating in the private interactive mode, via the recommendation engine, one or more recommendations of media content based on one or more predetermined parameters, receiving in the private interactive mode, via the user interface, one or more indications of a user request including a user interaction corresponding to the one or more recommendations of media content, generating in the private interactive mode, via the recommendation engine, additional recommendations of media content based on the received one or more indications of the user request, and permanently deleting information associated with the private interactive mode when receiving an indication to exit the private interactive mode. In some cases, the recommendation engine operating in the first interactive mode is independent of the information associated with the private interactive mode.

In another example embodiment, a method of obtaining media content using a private interactive mode on a media platform is provided. The method includes providing, via a user interface of a media platform, an indication to enter the private interactive mode from a first interactive mode on the media platform, receive in the private interactive mode, via the user interface, one or more recommendations of media content based on one or more predetermined parameters, providing in the private interactive mode, via the user interface, one or more indications of a user request including a user interaction corresponding to the one or more recommendations of media content, receiving in the private interactive mode, from the recommendation engine, additional recommendations of media content based on the one or more indications of the user request, and providing an indication to exit the private interactive mode. Information associated with the private interactive mode is permanently deleted when the private interactive mode is exited.

In yet another example embodiment, a system to provide media content using a private interactive mode on a media platform is provided. The system includes a memory configured to store data, and a processor configured to read the data from the memory and further configured to provide a media platform having a user interface and a recommendation engine. The media platform is configured to provide a first interactive mode and the private interactive mode. The processor is further configured to receive, via the user interface, an instruction to enter the private interactive mode, generate in the private interactive mode, via the recommendation engine, one or more recommendations of media content based on one or more predetermined parameters, receive in the private interactive mode, via the user interface, one or more indications of a user request including a user interaction corresponding to the one or more recommendations of media content, generate in the private interactive mode, via the recommendation engine, additional recommendations of media content based on the received one or more indications of the user request, and permanently delete data associated with the private interactive mode from the memory when receiving an indication to exit the private interactive mode.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
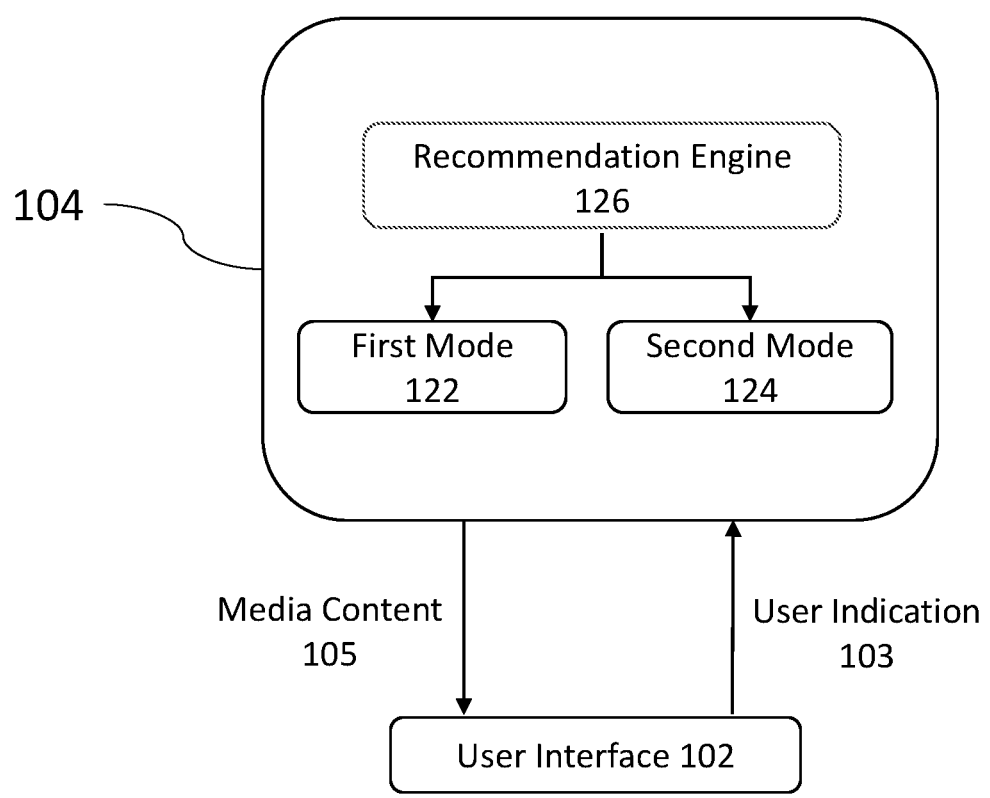
FIG. 1 illustrates an example system in which a media platform providing a private interactive mode may be implemented, in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It is to be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "media platform," "media application," "social media platform," or "social media application" may refer to an application on which algorithms and/or programs enabling execution or implementation of a collection of communication-based or media-sharing technologies may be hosted. Further, any algorithm or program described, recited, or suggested herein may be executed by one or more processors hosted on such a platform. Non-limiting examples of such technologies may include the creation, sharing, and/or storage of multi-media offerings.

As referenced herein, "machine learning," alternatively referenced herein as "ML," may refer to a learned or trained computer or processor-related technology by which decisions and/or actions are autonomously made, in place of human intervention. ML may refer to software, i.e., algorithms and/or programs, hardware or firmware, or any combination thereof that supports machine learning, natural language understanding, natural language processing, speech recognition, computer vision, etc. Also included among the range of ML functions and capabilities, and pertinent to the embodiments disclosed, recited, and suggested herein, model training or tuning.

As referenced herein, "model" may refer to software, such as algorithms and/or programs, hardware or firmware, or any combination thereof that supports machine learning, natural language understanding, natural language processing, speech recognition, computer vision, etc.

As reference herein, "engine" may refer to a type of software, firmware, hardware, or any combination thereof, that facilitates generation of source code or markup to produce elements that begin another process. In addition, or alternatively, an engine or generator may facilitate automated processes, in which various software elements interact to produce an intended product, whether physical or virtual based on natural language descriptions, inputs, or other prompts. In accordance with known ML technologies, the ML engines or generators disclosed, recited, and/or suggested herein are trained in accordance with either unimodal or multimodal training models.

As referenced herein, "a session of user experience in a mode on a media platform" may refer to a user experience during a period of time from a user entering the mode on the media platform to the user exiting that mode on the media platform.

With the features in the embodiment disclosed herein, a private interactive mode is provided on a media platform to provide media content to a user, in addition to a normal user mode associated to the user's profile on the media platform. A private interactive mode described herein may enable users to explore and obtain media content in a session without affecting the user's normal user mode. A private interactive mode described herein may also enable a higher level of privacy and control over user data and experience in using the media platform, as compared to a normal user mode associated with a user profile. It is to be understood that illustrative numbers are used in describing features in the embodiments described herein.

However, embodiments described herein are not limited to the number(s) described. That is, the number(s) described herein are provided for descriptive purposes only and are not intended to be limiting.

FIG. 1 illustrates an example system 100 in which a media platform may be implemented to provide a first interactive mode (first mode) 122 and a private interactive mode (second mode) 124, in accordance with at least some embodiments described herein.

In the embodiment depicted in FIG. 1, the system 100 implements a media platform 104 including a user interface 102 at the side of a user terminal device, and a recommendation engine 126 at the side of a media platform provider. The user interface 102 is connected to the recommendation engine 126 of the media platform 104 wirelessly or via wire. The user interface 102 can provide a user indication 103 of various user requests, actions, interactions, or inputs to the media platform 104, and the recommendation engine 126 at the media platform 104 can provide recommendations of media content 105 to the user interface 102 to present to users.

Upon receiving, via the user interface 102, a user request to operate in the first interactive mode 122 or the private interactive mode 124 on the media platform, the system 100 can implement the media platform to provide the corresponding modes, i.e., the first interactive mode 122 or the private interactive mode 124.

The user interface 102 may include graphic user interfaces (GUIs), command lines, or any other suitable interfaces. GUIs of the media platform may be displayed on one or more terminal devices at the user side.

In accordance with at least some example embodiments, a terminal device may be various electronic devices having display screens with audio and/or video inputs/outputs and supporting media content. The various electronic devices may include but are not limited to a smartphone, a tablet computer, an e-book reader, an MP3 (moving picture experts group audio layer III) player, an MP4 (moving picture experts group audio layer IV) player, a laptop computer, a desk computer, and/or any other suitable electronic devices.

The media platform 104 including the recommendation engine 126 may be hosted by one or more of a server or cluster of servers. A user may use one or more of the terminal devices to interact with the media platform 104 via a network, to e.g., request, transmit, or receive media content 105. Various applications, such as social media applications, video playing applications, or the like, may be installed on the terminal devices to facilitate the interaction between the user and the media platform 104.

In accordance with at least some example embodiments, a network may be a medium used to provide a communications link between one or more terminal devices and one or more of a server or cluster of servers. The network may be the Internet, a local area network (LAN), a wide area network (WAN), a local interconnect network (LIN), a cloud, etc. The network may enable users' online activities, and may be implemented by various types of connections, such as a wired communications link, a wireless communications link, an optical fiber cable, etc.

Any one or more of a server or cluster of servers upon which the media platform 104 is hosted and, therefore, automatic data generation is implemented, may refer to a high-performance computing (HPC) environment that includes, at least, a CPU and GPU that is present on a, e.g., a video card, embedded on a motherboard, or on the CPU die. The training and/or resulting automatic data generation, i.e., dataset expansion, may be executed entirely on the CPU or in part on the CPU and the GPU. Alternative embodiments may be executed in evolved HPC components known in the art. Regardless, the CPU, GPU, and/or HPC components may store one or more algorithms and/or programs that, when executed thereon, may cause the execution or performance of operations and/or functionality as disclosed and/or recited herein.

Also, a computer-readable non-volatile medium may be provided according to the embodiments described herein. The computer readable medium stores computer programs. The computer programs are used to, when being executed by a processor, execute or perform the operations or functionality in connection with at least the embodiments described and recited herein.

The system 100 may implement a media platform to provide the first interactive mode 122, e.g., a normal mode, a regular mode, or a user profile mode, in which a user can log in a user account (e.g., a social network account) associated with the user's profile.

In the first interactive mode 122, the recommendation engine 126 can implement or use one or more models to generate various recommendations of media content which are tailored to the user who logged in the user account. The various recommendations of media content can be presented, via the user interface 102, to the user. The models may be generated to provide users personalized recommendations and help users have a more personalized experience. In some cases, the models may be obtained by considering a combination of factors, including, for example, user interactions, media content information, user device and accounts settings, etc. Example user interactions may include liking or sharing media content (e.g., a video), following another user's account, posting a comment, creating or uploading media content, etc. The media content information may include, for example, details like captions, sounds, hashtags, etc. The user device and account settings may include, for example, a user language preference, a country setting, a device type, etc. The user interface 102 can receive a user interaction such as, for example, when the user, via the interface 102, play, listens, views certain media content, posts a comment on certain media content, follows other user's account, likes or shares certain media content, indicates not-interested in certain media content, creates or uploads certain media content, etc.

In some cases, the one or more models used by the recommendation engine 126 in the first interactive mode 122 may include one or more machine learning models. For example, the machine learning model in the first interactive mode 122 can be obtained or trained by using various input data related to, for example, user preferences or points of interest. For example, various input data including user interactions can be processed by the recommendation engine 126 and applied to tune parameters in the machine learning models.

Information associated with the first interactive mode 122, including, for example, user interactions with the media platform during a session of using the media platform by a user, can be stored in the user's profile associated with the user account by the system 100. Here, "a session of using the media platform" may refer to user experience during the period of time from the user's login to logout of the first interactive mode 122. The user's profile may include any data associated with the user's using of the media platform with the first interactive mode 122. In the first interactive mode 122, the media platform may update the user's profile and use the data in the user's profile to generate, via the recommendation engine 126, recommendations of media content to the user. For example, when the user interface 102 receives an indication from a user to enter into the first interactive mode 122 (e.g., the user logging in the media platform), the media platform can generate and present, via the user interface 102, various information associated with the user profile. The user interface 102 may further present various categories of recommended media content including, for example, new releases, recently viewed media content, a user's media library, etc.

The system 100 may further implement the media platform 104 to provide the private interactive mode 124. In the first interactive mode 122 (e.g., a normal mode), the user interface 102 may receive a user request to enter the private interactive mode 124. Upon receiving the user's request, the system 100 can allow the user to enter the private interactive mode 124 from the normal mode, and the user interface 102 may present the user a notification that the user is in the private interactive mode 124 on the media platform 104. For example, when a user logs in a user account associated with the user profile via the user interface 102 of the media platform on a terminal device (e.g., a smartphone), the user interface 102 may provide a selectable profile icon, on which the user can tap to select to exit the first interactive mode 122 (e.g., a normal mode) and enter the private interactive mode 124. When the user enters the private interactive mode 124, the user interface 102 may present a message confirming that the private interactive mode 124 is on. The user interface 102 may further provide in the private interactive mode 124 a selectable icon on which the user can tap to select to exit the private interactive mode 124. It is to be understood that the user interface 102 can receive the user's instruction to enter/exit the private interactive mode 124 by any suitable user actions such as, for example, by touching, by voice, by eye movement, etc.

When the user interface 102 receives the user's request to exit the first interactive mode 122 and enter the private interactive mode 124, the system 100 ceases providing any received indications 103 of user action or request to the one or more models used by the recommendation engine 126 associated with the first interactive mode 122. The system 100 may generate one or more new models associated with the private interactive mode 124 for the recommendation engine 126. While operating in the private interactive mode 124, any received indications 103 of user action or request may be provided to the new models implemented by the recommendation engine 126 to generate recommendations.

In some cases, the new models may be generated by modifying one or more of the models used by the recommendation engine 126 associated with the first interactive mode 122. For example, the models may include a multi-layer neural network structure with parameters as weights of connections. The modified models may add, remove, or modify one or more of layers in the multilayer neural network structure, and/or change one or more parameters of the neural network. It is to be understood that the modified models associated with the private interactive mode 124 may be independent from the models associated with the first interactive mode 122, and do not use any user data (e.g., the user's viewing history, preferences, etc.) associated with the user profile in the first interactive mode 122.

By the non-limiting embodiments described and recited herein, the new models associated with private interactive mode 124 may be used by the recommendation engine 126 for a session of operating the private interactive mode 124, e.g., from the user entering the private interactive mode 124 to the user exiting the private interactive mode 124. In other words, the recommendation engine 126 may use the new model(s) associated with the private interactive mode 124 to learn the user's interest or preference and provide recommendations of media content during a single session of user experience in the private interactive mode. This may be different from that in the first interactive mode 122 (e.g., a normal mode), in which user model(s) may be associated with a user profile. The recommendation engine 126 may use the user model(s) to learn the user's interest or preference and provide recommendations of media content during each session of user experience in the normal model as long as the user logs in the user account.

In some cases, the new models associated with the private interactive mode 124 may be generated with parameters or rules to learn the user's interest or preference at a speed relatively faster than the models associated with a user profile in the first interactive mode 122 (e.g., a normal mode). For example, the models associated with the private interactive mode 124 may be generated with suitable parameters or rules to provide relatively more recommendations of media content within a given period of time, as compared to that in first interactive mode 122 (e.g., a normal mode).

In some cases, depending on the length of a session (e.g., from a few minutes to a few hours), the new models associated with private interactive mode 124 may be generated with different parameters or rules to learn the user's interest or preference at different speeds. For example, when the length of a session is relatively short, the models may be generated with suitable parameters or rules to provide more recommendations of media content within a given period of time.

In some cases, the recommendation engine 126 may use the new models associated with private interactive mode 124 to generate recommendations of short videos having a maximum length. For example, a short video may be up to five-minutes long, up to three-minutes long, up to two-minutes long, up to one-minute long, up to thirty-seconds long, up to twenty-seconds long, or even up to ten-seconds long. A short video may be at least one-second long, at least two-seconds long, or at least three-seconds long. In some cases, a recommendation of short videos may include a combination of multiple short videos having different lengths.

When a user enters the private interactive mode 124, the recommendation engine 126 can generate one or more recommendations of media content based on one or more predetermined parameters. The one or more predetermined parameters may include, for example, device information (e.g., a device type, a screen size, etc.), a language setting, geographic information such as a location or country setting, locale information, etc. These parameters can be predetermined by, for example, extracting the related device information from a terminal device (e.g., a smartphone) used by the user to communicate with the media platform.

In some cases, the recommendation engine 126 may use one or more predetermined parameters based on local cookie information stored on the user's terminal device (e.g., a smartphone). It is to be understood that the recommendation engine 126 may not use cookie information stored on the side of media platform provider (e.g., a server). It is also to be understood that, in one embodiment, cookie information associated with the normal mode may not be used. In addition, the local cookie information stored on the user's terminal device may not be updated to reflect the user's using of the private interactive mode 124 on the media platform.

In some cases, the recommendation engine 126 may use the one or more predetermined parameters to tailor general recommendations that are provided to a new user of the media platform. The general recommendations for a new user may include, for example, trending content that is currently popular and receiving a relatively high level of engagement from users of the media platform, emerging content that is starting to gain traction and attract a growing audience on the media platform, and live content that is currently being broadcast in real time on the media platform. The tailored recommendations generated by the recommendation engine 126 for a user using the private interactive mode 124 may be user-specific or device-specific, e.g., by considering the one or more predetermined parameters (e.g., location, language, device type, screen size, locale, local cookie information, etc.). These parameters may be predetermined by extracting from a terminal device (e.g., a smartphone) used by the user at that point to communicate with the media platform.

In some cases, the one or more predetermined parameters can be provided as input data to the models used by the recommendation engine 126 to generate recommendations of media content in the private interactive mode 124. For example, language information and/or location information from the user's device can be used to tune the models to generate suitable recommendations in the private interactive mode 124.

In some cases, the media platform may generate, e.g., via the recommendation engine 126, and present, e.g., via the user interface 102, a list of selectable categories of user interest to the user. The user may select one or more items from the list to indicate his interest or preference. In some cases, the list of selectable categories may be generated by considering the one or more predetermined parameters such as, for example, the user's preferred language. The generated list of selectable categories may be tailored by the one or more predetermined parameters for different users. For example, in one embodiment, different lists may be generated for users using different languages. In one embodiment, different lists may be generated when at least one of the predetermined parameters (e.g., location, device type, screen size, locale, local cookie information, etc.) is different.

It is to be understood that a user may provide input or requests, via the user interface, in any suitable manners. In some cases, the user may indicate user interest or preference by filling in a form, by requesting one or more choices, by selecting one or more items from a list in a form, by searching media content via a search tool (e.g., a search bar, a search box, or a search field), by interacting with presented media content (e.g., expressing "like" or "dislike" for the presented media content), a combination thereof, etc. For example, in the private interactive mode, a user may indicate user interest of "dancing video" by filling in a form, submitting a search request, selecting from a pre-determined list, by clicking a "like" feature for a presented dancing video, by clicking a play button for a presented dancing video, etc., via the user interface 102. It is to be understood that the user's actions or interactions with the media content may be permanently deleted when the user exits the private mode, which will be discussed further below.

When receiving the user's input, via the user interface 102, the recommendation engine 126 can generate recommendations of media content based on the user's input, in addition to the predetermined parameters. In some cases, the user's input or indication can be provided as input data to the models used by the recommendation engine to generate the recommendations of media content.

When the user receives, via the user interface 102, the recommended media content, the user may take one or more user actions, via the user interface 102. For example, the user may play, select, view, like, or dislike the received media content. Indications of the one or more user actions can be received by the user interface 102 and provided to the recommendation engine 126 as user's feedback data. For example, the user interface 102 may track the time the user viewed the received media content, and provide the time data to the recommendation engine 126 as user's feedback data. It is to be understood that the user's feedback data may not be limited to a user action or request corresponding to the received recommendations of media content. For example, a user action may be a request to play certain media content (e.g., a short video) which may or may not be inside the received recommendations, in which case, the media platform 104 may provide the requested short video to the user interface 102 to play.

In some cases, the user interface 102 in the private interactive mode 124 may not allow the user to input any comments on the received media content. To leave a comment via the user interface 102, the user may need to exit the private interactive mode 124. Upon receiving the user's indication to exit the private interactive mode 124, the user interface 102 may allow the user to exit the private interactive mode 124 and re-enter the first interactive mode 122 (normal mode) 122, in which the user can input comments on media content. The comments on media content received in the normal mode associated with the user's profile may not be provided to the recommendation engine 126 as user's feedback data associated with the private interactive mode 124. When a user exits the private interactive mode 124, the system 100 may follow a default setting (e.g., provided by a mobile application, or a web application) to allow the user to automatically go back to the normal mode 122. In some cases, the user may be required to log in the user account for using the normal mode. In some cases, the user may have the option to log in or stay logged out for using the normal mode. The user may be required to log in the user account to input comments on media content.

In some cases, the user's feedback data associated with the private interactive mode 124 can be provided as input data to the models to tune or train the models implemented by the recommendation engine 126 associated with the private interactive mode 124. The tuned or trained models can be used to generate additional recommendations of media content, which may invite additional user's feedback data to further tune or train the models associated with the private interactive mode 124. By repeatedly providing recommendations and receiving feedback data from the user, the recommendation engine 126 can tune the models to recommend media content reflecting the user's preferences or points of interest when using the media platform with the private interactive mode 124. In other words, the recommendation engine 126 may use the models associated with the private interactive mode 124 for a session of operating the private interactive mode 124. Here, a "session" may refer to the period of time from the user entering the private interactive mode 124 to exiting the private interactive mode 124.

When the user interface 102 receives an indication from the user to exit the private interactive mode 124, the system 100 can permanently delete any data or information associated with the private interactive mode 124 from the system 100. In general, user data associated a session of using the media platform by a user in the private interactive mode 124, may be deleted when the user exits that session of use. In some cases, upon the receiving of the indication to exit the private interactive mode 124, the system 100 may permanently delete any data or information which was used as input data to tune or train the model(s) used by the recommendation engine 126 in a session of operating the private interactive mode 124. The system 100 may permanently delete any data or information which was output data of the model(s) used by the recommendation engine 126 in the session.

The data or information to be deleted when exiting the private interactive mode 124 may further include, for example, user's input to indicate user interest or preference, historical recommendations of media content provided to the user, user's actions taken as feedback data to the recommendations, user's browsing information, user's watching and interaction history, cookie information, form data, etc., in a session of operating the private interactive mode 124. For example, when the user exits a session of using the private interactive mode after watching dancing videos on the user's smartphone, the user's data in that session including, e.g., historical recommendations of dancing videos, user's browsing information of dancing videos, user's watching and interaction history of dancing videos, etc., can be permanently deleted when the private interactive mode is exited.

The term "permanently deleting" may refer to that when exiting the private interactive mode 124, the data or information to be deleted may not have a backup or be recovered/restored in the system 100 or at any physical device (e.g., a memory). In addition, the system 100 may not allow the data or information associated with the private interactive mode 124 to be linked to the user's profile before the deleting of the data or information.

In some cases, the media platform 104 may track user actions or interaction with specific media content without associating the actions or interactions with any user or user profile. In other words, the media platform 104 may use data on user action associated with media content without receiving and storing user personal information associated with the user profile. For example, the media platform 104 may track the numbers of views or likes received for a specific media content (e.g., a dancing video) without associating the actions with the users who have taken the actions.

In some cases, the recommendation engine 126 operating in the first interactive mode 122 can be independent of the information associated with the private interactive mode 124. For example, the user indication 103 received by the user interface 102 in the private interactive mode 124 may not be provided to the recommendation engine 126 in the first interactive mode 122. Input and output data of the recommendation engine 126 operating in the private interactive mode 124 may not be provided to the recommendation engine 126 operating in the first interactive mode 122.

In some cases, the recommendation engine 126 operating in the private interactive mode 124 can be independent of the information associated with the first interactive mode 122. For example, the user indication 103 received by the user interface 102 in the first interactive mode 122 may not be provided to the recommendation engine 126 operating in private interactive mode 124. Input and output data of the recommendation engine 126 operating in the first interactive mode 122 may not be provided to the recommendation engine 126 operating in the private interactive mode 124.

Figure 2:
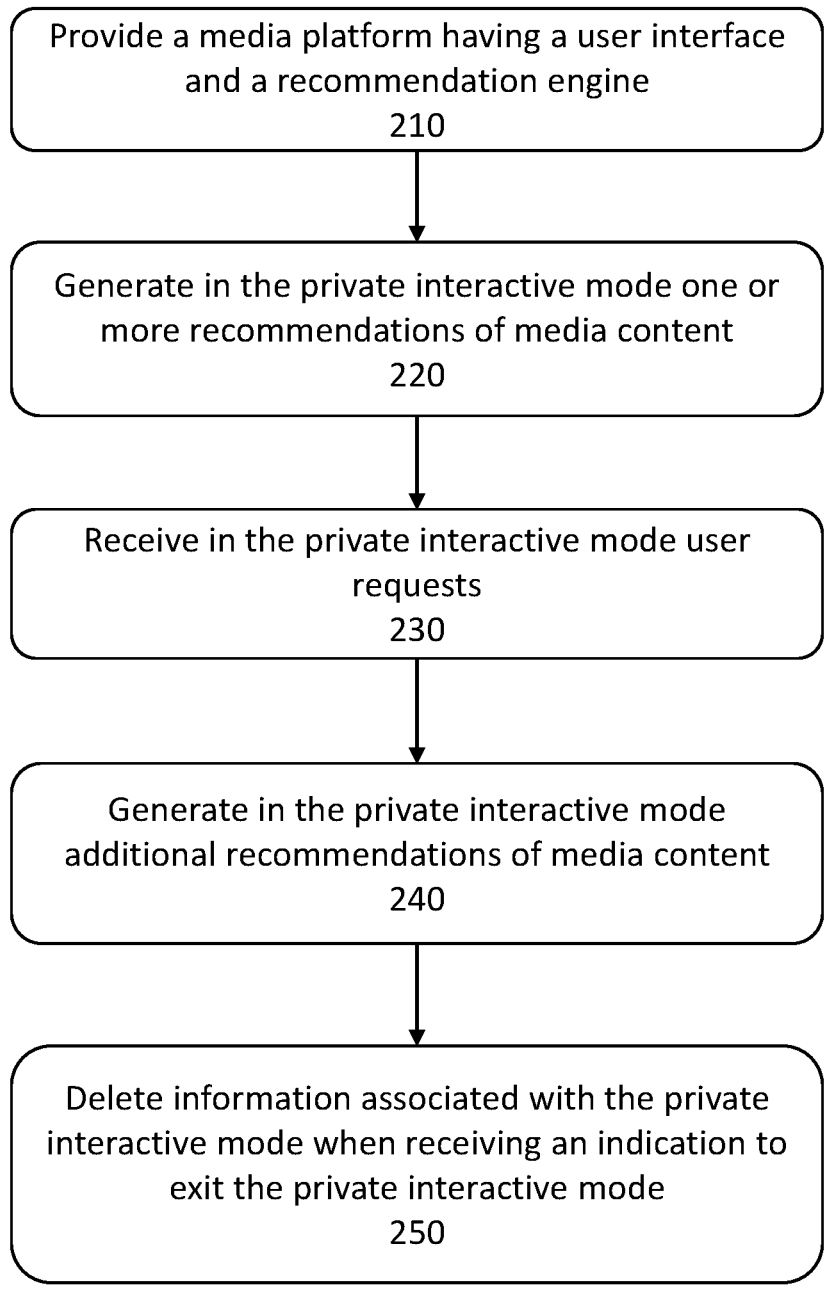
FIG. 2 is a flow chart illustrating an example process in which a private interactive mode on a media platform may be implemented to provide media content, in accordance with at least some embodiments described herein.

FIG. 2 is a flow chart illustrating an example process 200 in which a private interactive mode on a media platform may be implemented to provide media content, in accordance with at least some embodiments described herein. Processing flow 200 may include various operations, functions, or actions as illustrated by one or more of blocks 210, 220, 230, 240, and 250. These various operations, functions, or actions may, for example, correspond to software, program code, or program instructions executable by a processor that causes the functions to be performed. Processing may begin at block 210.

At block 210, a media platform is provided to have a user interface and a recommendation engine, and to provide a first interactive mode and a private interactive mode. For example, as illustrated in the embodiment of FIG. 1, a media platform can be implemented by the system 100 to have the user interface 102 and the recommendation engine 126, and to provide the first interactive mode 122 and the private interactive mode 124. Processing 200 then proceeds to block 220.

At block 220, the recommendation engine 126 generates in the private interactive mode 124 one or more recommendations of media content based on one or more predetermined parameters. The one or more predetermined parameters may include, for example, a device type, a language setting, a location or country setting, etc. In some cases, the user interface 102 may receive the user's input to indicate user interest or preference, and the recommendation engine can generate recommendations of media content based on the user's input, in addition to the predetermined parameters. In some cases, the one or more predetermined parameters, and the user's input or indication can be provided as input data to the one or more models used by the recommendation engine 126 to generate the recommendations of media content in the private interactive mode. Processing 200 then proceeds to block 230.

At block 230, the user interface 102 receives, in the private interactive mode, one or more indications of a user request, including a user action based on the one or more received recommendations of media content. The user action may include, for example, playing, selecting, viewing, liking, or disliking the received media content. It is to be understood the user action or request may further include any user input to indicate the user's interest or preference regarding media content to be provided. Indications of the one or more user actions or requests can be provided to the recommendation engine 126 as user's feedback data. Processing 200 then proceeds to block 240.

At block 240, the recommendation engine 126 generates, in the private interactive mode, additional recommendations of media content based on the received one or more indications of the user request or action, including the user's feedback data. In some cases, the user's feedback data associated with the private interactive mode can be provided as input data to tune or train the one or more models used by the recommendation engine 126 associated with the private interactive mode. The tuned or trained models can be used to generate additional recommendations of media content, which may invite additional user's feedback data to further tune or train the models in the same session of using the media platform with the private interactive mode. Processing 200 then proceeds to block 250.

At block 250, the system 100 may permanently delete information associated with the private interactive mode when the user interface 102 receives an indication to exit the private interactive mode. In general, any user data associated with a session of using the media platform by a user in the private interactive mode 124, may be deleted when the user exits that session of use. For example, the recommendation engine 126 can permanently delete any input or output data associated with the models in the session. The system 100 may also delete, for example, user's input to indicate user interest or preference, historical recommendations of media content provided to the user, user's actions taken as feedback data to the recommendations, user's browsing information, user's watching and interaction history, cookie information, form data, etc., which are used or obtained in the session of user operating the private interactive mode.

Figure 3:
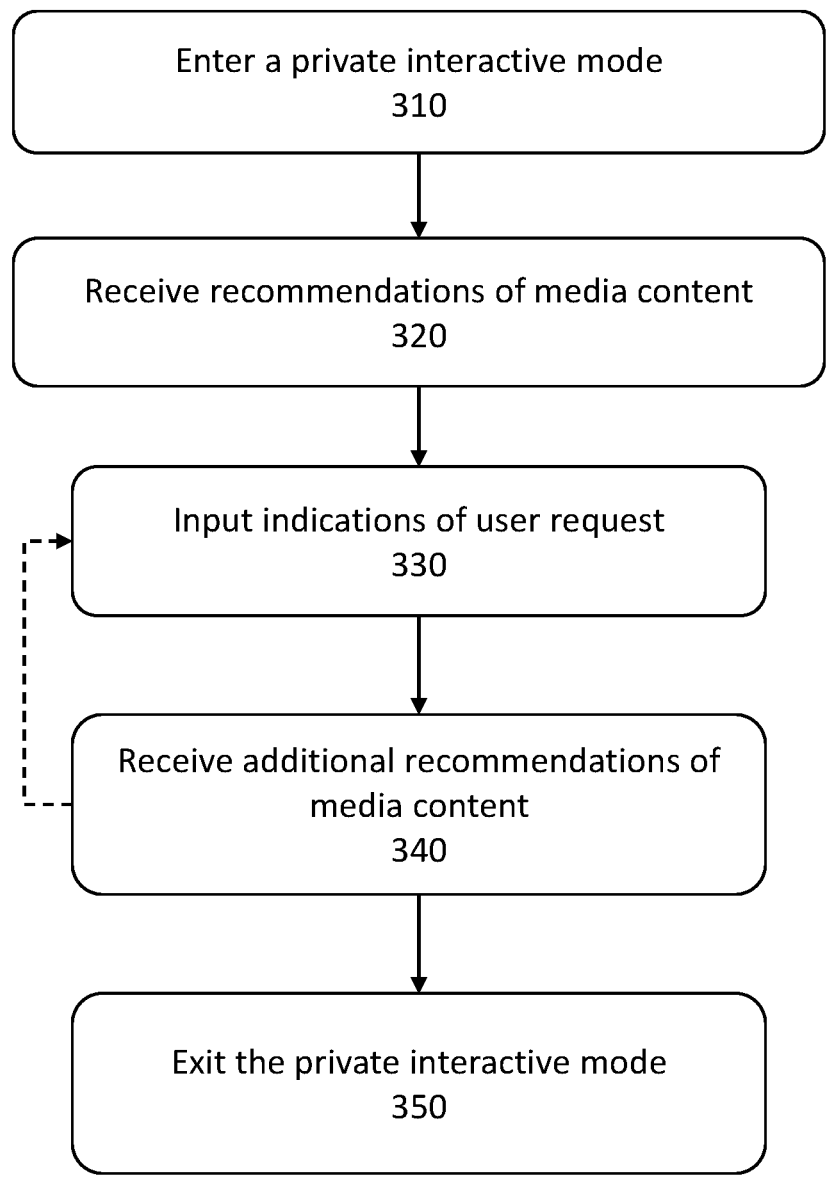
FIG. 3 is a flow chart illustrating an example process in which a private interactive mode on a media platform may be implemented for a user to obtain media content, in accordance with at least some embodiments described herein.

FIG. 3 is a flow chart illustrating an example process 300 in which a private interactive mode on a media platform may be implemented for a user to obtain media content, in accordance with at least some embodiments described herein. Processing flow 300 may include various operations, functions, or actions as illustrated by one or more of blocks 310, 320, 330, 340, and 350. These various operations, functions, or actions may, for example, correspond to software, program code, or program instructions executable by a processor that causes the functions to be performed. Processing may begin at block 310.

At block 310, the user may provide, via the user interface 102 of the media platform, an indication to enter the private interactive mode 124 from the first interactive mode 122 on the media platform 104. For example, the user may tap an icon in the user interface 102 to select to exit the normal mode associated with the user profile and enter the private interactive mode. Processing 300 then proceeds to block 320.

At block 320, the user may receive in the private interactive mode, via the user interface 102, one or more recommendations of media content from the recommendation engine 126 based on one or more predetermined parameters. The predetermined parameters may include, for example, a device type, a language setting, geographic information such as a location or country setting, etc. In some cases, the user may provide input according to a query presented by the user interface 102 to indicate interest or preference, and the recommendations may be based on the indicated user interest or preference. In some cases, recommendations may include a generalized feed of popular media content (e.g., videos). Processing 300 then proceeds to block 330.

At block 330, the user may provide in the private interactive mode, via the user interface 102, one or more indications of a user request, including a user interaction corresponding to the one or more recommendations of media content. The user's indications may serve as feedback data to allow the models implemented by the recommendation engine 126 to learn the user's interest or preference in the session of operating the private interactive mode. Processing 300 then proceeds to block 340.

At block 340, the user receives in the private interactive mode, via the user interface 102, additional recommendations of media content generated by the recommendation engine 126 based on the one or more indications of the user request. By repeatedly receiving recommendations from the recommendation engine, and providing feedback to the recommendation engine, the user can help tune the models to recommend media content reflecting the user's preference in the session of using the media platform with the private interactive mode. Processing 300 then proceeds to block 350.

At block 350, the user provides an indication, via the user interface 102, to exit the private interactive mode. For example, the user can tap a selectable icon on the user interface 102 in the private interactive mode to select to exit the private interactive mode. Upon the user's exiting, the system 100 can permanently delete the data and information associated with the session of user's using of the media platform with the private interactive mode. With the data and information being deleted, when the user enters the normal mode, or enters a new session of private interactive mode, the user's experience may not be affected by the user's activities in the past session(s) of private interactive mode.

Figure 4:
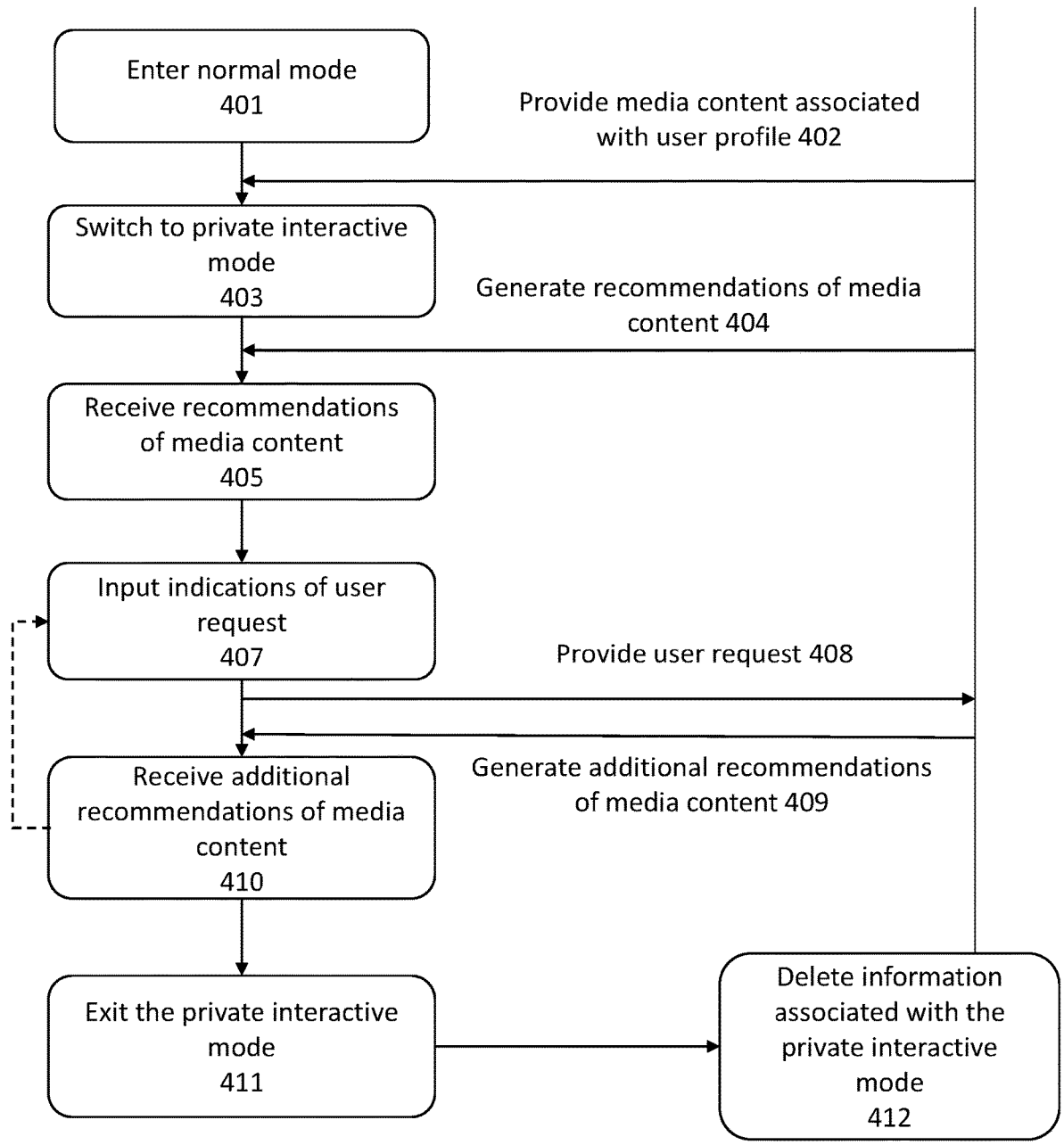
FIG. 4 illustrates an example information flow in using a private interactive mode on a media platform, in accordance with at least some embodiments described herein.

FIG. 4 illustrates an example information flow in operating a private interactive mode on a media platform to provide media content to a user, in accordance with at least some embodiments described herein. As shown in FIG. 4, a media platform may provide a first interactive mode, such as a normal mode, to allow a user to log in a user account, at 401. Using of the normal mode on the media platform may include receiving, via a user interface, media content associated with the user profile provided by the media platform provider, at 402. The user interface may receive a user indication to enter the private interactive mode from the normal mode, at 403. While operating in the private interactive mode, the recommendation engine can generate recommendations of media content based on predetermined parameters, at 404. The user may receive, via the user interface, the recommendations, at 405. Upon receiving the recommendations of media content from the recommendation engine, the user may input feedback, or indications of user request or action corresponding to the received recommendations, at 407. The feedback data may be provided to the recommendation engine, at 408. With the received user feedback, the recommendation engine may generate additional recommendations of media content, at 409, which may be provided to the user interface, at 410, and invite additional user's feedback to further tune or train the models of the recommendation engine associated with the private interactive mode. By repeatedly providing recommendations and receiving feedback data from the user, the recommendation engine at the media content provider side can tune the models to recommend media content reflecting the user's preferences or points of interest. When the user indicates to exit the private interactive mode, at 411, user data and information associated with the session of operating the media platform with the private interactive mode may be permanently deleted, at 412. With the user data and information associated with the session being deleted, when the user re-enters the normal mode, at 401, and/or starts a new session of private interactive mode, at 403, the user's experience may not be affected by the user's past session(s) of operating the media platform with the private interactive mode.

Figure 5:
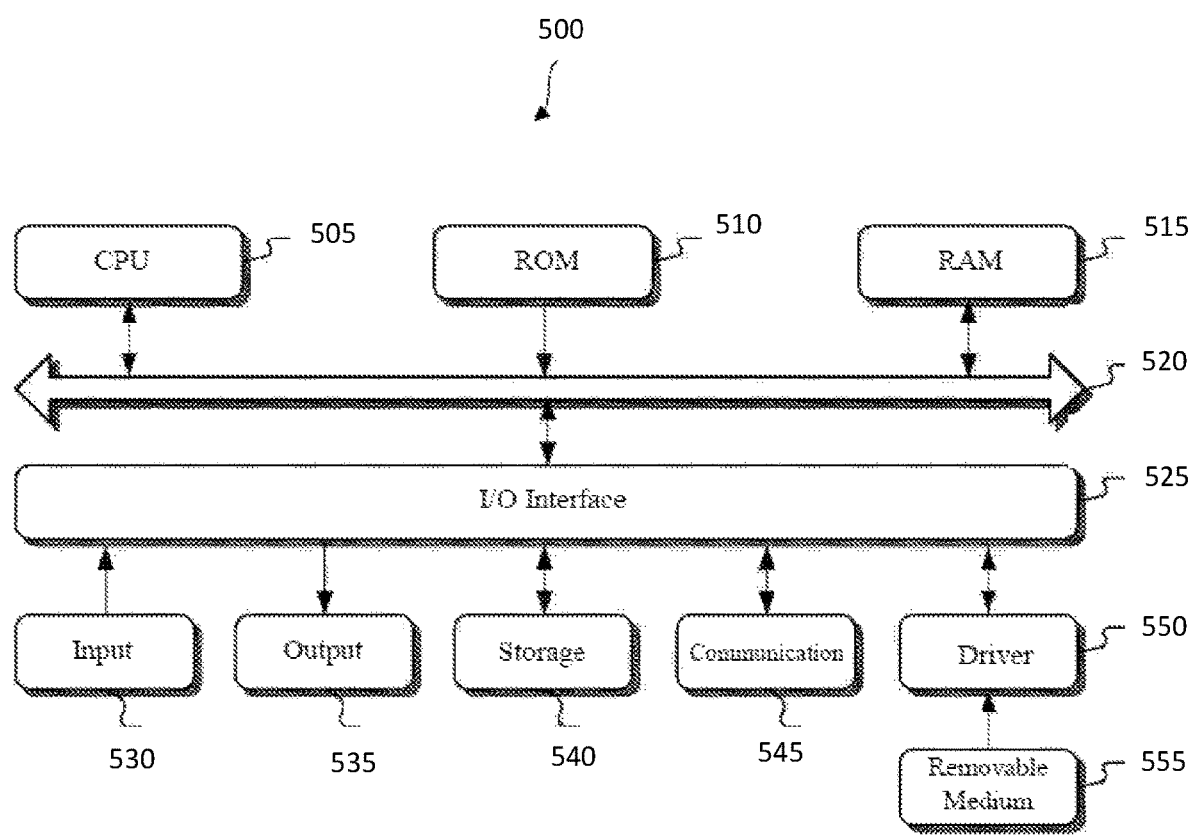
FIG. 5 is a schematic structural diagram of an example computer system applicable to implementing an electronic device, arranged in accordance with at least some embodiments described herein.

FIG. 5 is a schematic structural diagram of an example computer system 500, in which any of the processes and sub-processes of operating a private interactive mode on a media platform to provide media content may be implemented as executable instructions stored on a non-volatile computer-readable medium. The computer-readable instructions may, for example, be executed by a processor of a device, as referenced herein, having a network element and/or any other device corresponding thereto, particularly as applicable to the applications and/or programs described above corresponding to system 100 to implement a media platform. It is to be understood that the computer system shown in FIG. 5 is provided for illustration only instead of limiting the functions and applications of the embodiments described herein.

As depicted, the computer system 500 may include a central processing unit (CPU) 505.

The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display, a speaker, or the like; a storage device 540 including a hard disk or the like; and a communication device 545 including a network interface card such as a LAN card, a modem, or the like. The communication device 545 may perform communication processing via a network such as the Internet, a WAN, a LAN, a LIN, a cloud, etc. In an example embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowcharts of FIGS. 2-4 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method of providing media content using a private interactive mode on a media platform, the method comprising:

providing the media platform having a user interface and a recommendation engine, the media platform being configured to provide a first interactive mode and the private interactive mode;

receiving, via the user interface, an instruction to enter the private interactive mode;

generating in the private interactive mode, via the recommendation engine, one or more recommendations of media content based on one or more predetermined parameters;

receiving in the private interactive mode, via the user interface, one or more indications of a user request, the user request comprising a user interaction corresponding to the one or more recommendations of media content;

generating in the private interactive mode, via the recommendation engine, additional recommendations of media content based on the received one or more indications of the user request; and permanently deleting information associated with the private interactive mode when receiving an indication to exit the private interactive mode.

Aspect 2. The method of Aspect 1, wherein the one or more predetermined parameters include one or more of a device type, a language setting, and a location setting.

Aspect 3. The method of Aspect 1 or 2, further comprising presenting, via the user interface, a list of selectable categories of user interest.

Aspect 4. The method of Aspect 3, further comprising receiving, via the user interface, an indication of user selection of one or more of the selectable categories of user interest.

Aspect 5. The method of Aspect 4, wherein the generating of the one or more recommendations is further based on the received indication of user selection.

Aspect 6. The method of any of Aspects 1-5, further comprising ceasing providing the received one or more indications of the user request to a machine learning model associated with the first interactive mode, upon the receiving of the instruction to enter the private interactive mode.

Aspect 7. The method of Aspect 6, further comprising modifying the machine learning model to operate in the private interactive mode.

Aspect 8. The method of Aspect 7, further comprising providing the one or more indications of the user request, as input data, to the modified machine learning model.

Aspect 9. The method of Aspect 7 or 8, further comprising upon the receiving of the indication to exit the private interactive mode, permanently deleting data associated with the modified machine learning model.

Aspect 10. The method of any of Aspects 1-9, further comprising presenting in the private interactive mode, via the user interface, a notification of the private interactive mode.

Aspect 11. The method of any of Aspects 1-10, wherein the recommendation engine operating in the first interactive mode is independent of the information associated with the private interactive mode.

Aspect 12. A method of obtaining media content using a private interactive mode on a media platform, the method comprising:

providing, via a user interface of the media platform, an indication to enter a private interactive mode from a first interactive mode on the media platform;

receive in the private interactive mode, via the user interface, one or more recommendations of media content based on one or more predetermined parameters;

providing in the private interactive mode, via the user interface, one or more indications of a user request, the user request comprising a user interaction corresponding to the one or more recommendations of media content;

receiving in the private interactive mode, via the user interface, additional recommendations of media content based on the one or more indications of the user request; and providing an indication to exit the private interactive mode, wherein information associated with the private interactive mode is permanently deleted when the private interactive mode is exited.

Aspect 13. The method of Aspect 12, further comprising receiving in the private interactive mode, via the user interface, a list of selectable categories of user interest.

Aspect 14. The method of Aspect 13, further comprising providing in the private interactive mode, via the user interface, an indication of user selection of one or more of the selectable categories of user interest.

Aspect 15. The method of Aspect 14, wherein the one or more recommendations are further based on the received indication of user selection.

Aspect 16. The method of any of Aspects 12-15, further comprising receiving in the private interactive mode, via the user interface, a notification of the private interactive mode.

Aspect 17. A system to provide media content using a private interactive mode on a media platform, the system comprising:

a memory configured to store data; and a processor configured to read the data from the memory and further configured to: provide the media platform having a user interface and a recommendation engine, the media platform being configured to provide a first interactive mode and a private interactive mode;

receive, via the user interface, an instruction to enter the private interactive mode; generate in the private interactive mode, via the recommendation engine, one or more recommendations of media content based on one or more predetermined parameters;

receive in the private interactive mode, via the user interface, one or more indications of a user request, comprising a user interaction corresponding to the one or more recommendations of media content;

generate in the private interactive mode, via the recommendation engine, additional recommendations of media content based on the received one or more indications of the user request; and permanently delete data associated with the private interactive mode from the memory when receiving an indication to exit the private interactive mode.

Aspect 18. The system of Aspect 17, wherein the processor is further configured to modify a machine learning model associated with the first interactive mode to operate in the private interactive mode.

Aspect 19. The system of Aspect 18, wherein the processor is further configured to provide the one or more indications of the user request, as input data, to the modified machine learning model.

Aspect 20. The system of Aspect 18 or 19, wherein the processor is further configured to permanently delete data associated with the modified machine learning model from the memory, when receiving the indication to exit the private interactive mode.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method of providing media content using a private interactive mode on a media platform, the method comprising:
    providing the media platform having a user interface and a recommendation engine, the media platform being configured to provide a first interactive mode and the private interactive mode;
    receiving, via the user interface, an instruction to enter the private interactive mode;
    generating in the private interactive mode, via the recommendation engine, one or more recommendations of media content based on one or more predetermined parameters;
    receiving in the private interactive mode, via the user interface, one or more indications of a user request, the user request comprising a user interaction corresponding to the one or more recommendations of media content;
    providing the one or more indications of the user request to a second machine learning model to produce a trained machine learning model, the second machine learning model associated with the private interactive mode and configured to learn a user's preferences based on the one or more indications of the user request;
    generating in the private interactive mode, via the recommendation engine using the trained machine learning model, additional recommendations of media content based on the received one or more indications of the user request; and
    in response to receiving an indication to exit the private interactive mode:
        deleting the one or more indications of the user request; and
        deleting the trained machine learning model.

2. The method of claim 1, wherein the one or more predetermined parameters include one or more of a device type, a language setting, and a location setting.

3. The method of claim 1, further comprising presenting, via the user interface, a list of selectable categories of user interest.

4. The method of claim 3, further comprising receiving, via the user interface, an indication of user selection of one or more of the selectable categories of user interest.

5. The method of claim 4, wherein the generating of the one or more recommendations is further based on the received indication of user selection.

6. The method of claim 1, further comprising:
    in response to receiving the instruction to enter the private interactive mode:
        ceasing providing indications of the user request to a first machine learning model associated with the first interactive mode.

7. The method of claim 6, wherein the second machine learning model is pre-trained to provide relatively more recommendations of media content than the first machine learning model.

8. The method of claim 1, further comprising presenting in the private interactive mode, via the user interface, a notification of the private interactive mode.

9. The method of claim 1, wherein the recommendation engine operating in the first interactive mode is independent of information associated with the private interactive mode.

10. The method of claim 1, wherein the one or more predetermined parameters comprise local cookie information from the user's terminal device.

11. The method of claim 10, wherein the local cookie information from the user's terminal device is not updated by the one or more indications of the user request.

12. A method of obtaining media content using a private interactive mode on a media platform, the method comprising:
    providing, via a user interface of the media platform, an indication to enter the private interactive mode from a first interactive mode on the media platform;
    receive in the private interactive mode, via the user interface, one or more recommendations of media content based on one or more predetermined parameters;
    providing in the private interactive mode, via the user interface, one or more indications of a user request, the user request comprising a user interaction corresponding to the one or more recommendations of media content;
    receiving in the private interactive mode, via the user interface, additional recommendations of media content based on the one or more indications of the user request, wherein the additional recommendations are provided by a second machine learning model associated with the private interactive mode and configured to learn a user's preferences based on the one or more indications of the user request, and wherein the second machine learning model is trained on the one or more indication of the user request; and
    providing an indication to exit the private interactive mode, wherein in response to the user request the media platform will delete the one or more indications of the user request and the second machine learning model.

13. The method of claim 12, further comprising receiving in the private interactive mode, via the user interface, a list of selectable categories of user interest.

14. The method of claim 13, further comprising providing in the private interactive mode, via the user interface, an indication of user selection of one or more of the selectable categories of user interest.

15. The method of claim 14, wherein the one or more recommendations are further based on the indication of user selection.

16. The method of claim 12, further comprising receiving in the private interactive mode, via the user interface, a notification of the private interactive mode.

17. A system to provide media content using a private interactive mode on a media platform, the system comprising:
    a memory configured to store data; and
    a processor configured to read the data from the memory and further configured to: provide the media platform having a user interface and a recommendation engine, the media platform being configured to provide a first interactive mode and the private interactive mode;
    receive, via the user interface, an instruction to enter the private interactive mode;
    generate in the private interactive mode, via the recommendation engine, one or more recommendations of media content based on one or more predetermined parameters;

receive in the private interactive mode, via the user interface, one or more indications of a user request, comprising a user interaction corresponding to the one or more recommendations of media content;

provide the one or more indications of the user request to a second machine learning model to produce a trained machine learning model, the second machine learning model associated with the private interactive mode and configured to learn a user's preferences based on the one or more indications of the user request;

generate in the private interactive mode, via the recommendation engine using the trained machine learning model, additional recommendations of media content based on the received one or more indications of the user request; and in response to receiving an indication to exit the private interactive mode:

delete the one or more indications of the user request; and delete the trained machine learning model.

18. The system of claim 17, wherein the processor is further configured to modify a first machine learning model associated with the first interactive mode to operate in the private interactive mode.

19. The system of claim 18, wherein the processor is further configured to provide the one or more indications of the user request, as input data, to the modified first machine learning model.

20. The system of claim 18, wherein the processor is further configured to permanently delete data associated with the modified first machine learning model from the memory, when receiving the indication to exit the private interactive mode.

* * * * *